United States Patent [19]

Brummett

[11] Patent Number: 4,585,661
[45] Date of Patent: Apr. 29, 1986

[54] HEATING APPARATUS AND METHOD OF HEATING A FOOD PRODUCT

[75] Inventor: Barry J. Brummett, Santa Ana, Calif.

[73] Assignee: Taco Bell, Irvine, Calif.

[21] Appl. No.: 701,385

[22] Filed: Feb. 14, 1985

[51] Int. Cl.⁴ ............................ A23L 1/00; F24D 1/00
[52] U.S. Cl. ...................................... 426/520; 99/467;
126/20.1; 126/21 A; 126/369; 426/510;
426/511; 219/401
[58] Field of Search ...................... 426/520, 510, 511;
99/467; 126/21 A, 20, 20.1, 369; 219/401

[56] References Cited

U.S. PATENT DOCUMENTS 3,320,945 5/1967 Dunkelman ......................... 126/369
4,154,861 5/1979 Smith .................................. 426/520
4,167,585 9/1979 Caridis et al. ...................... 426/510

Primary Examiner—George Yeung
Attorney, Agent, or Firm—Scully, Scott, Murphy & Presser

[57] ABSTRACT

An apparatus for the rapid and essentially uniform heating of a food product, including a heating oven utilizing a novel heat generating system for the generating of a heated gaseous fluid medium, such as steam, for the rapid heating or cooking of food, and wherein the apparatus is adapted for home and/or commercial utilizations. Moreover, also disclosed is a method for the rapid and uniform heating or cooking of a food product through the intermediary of heated steam employing the inventive apparatus.

18 Claims, 9 Drawing Figures

HEATING APPARATUS AND METHOD OF HEATING A FOOD PRODUCT

BACKGROUND OF THE INVENTION

1. Field of the Invention

The present invention relates to an apparatus for the rapid and essentially uniform heating of a food product, and more particularly pertains to a heating oven utilizing a novel heat generating system for the generating of a heated gaseous fluid medium, such as steam for the rapid heating or cooking of food, and wherein the apparatus is adapted for home and/or commercial utilizations. Moreover, the invention also relates to a method for the rapid and uniform heating or cooking of a food product through the intermediary of heated steam employing the inventive apparatus.

In many instances, when it is desired to effectuate the rapid and uniform heating and/or cooking of a food product, for example, in establishments or restaurants, in effect, those of the so-called "fast-food" genre, it is necessary, due to reasons of economics, that the food product be heated within the shortest period of time in order to obtain a quick turnover in the serving of the customers. For example, in fast-food restaurants serving pizza, wherein the lower pizza pastry layers or shells may have been precooked, and are covered with the tomato sauce, spices, and onto which a top layer of cheese has been applied, it is important that the pizza be heated and the cheese layer be melted as rapidly as possible while imparting uniform surface heating thereto, so as to produce a product which is of an appetizing and attractive appearance to a customer. Although numerous types of heating and/or cooking appliances and ovens have been proposed in order to provide the desired results, none of these have proven themselves to be satisfactory in providing an inexpensive and satisfactorily generating apparatus which will impart the required uniform degree of heating to the food product within a suitably short time frame so as not to only produce an appropriately cooked or heated food product of a highly aesthetic appeal to a customer, but which will also meet requirements for quick service, particularly in the high-volume turnover encountered in the fast-food industry. Additionally, it is of importance that the apparatus be simple to operate and service by relatively unskilled personnel, while necessitating only a moderate financial investment rendering it highly economical, while satisfying the above-mentioned criteria in the heating and/or cooking of the food product.

Essentially, the inventive heating apparatus, which is particularly designed for the rapid and substantially uniform heating of a food product, such as pizza or the like, contemplates the provision of an enclosure in the form of a cabinet which, pursuant to a preferred embodiment of the invention, incorporates two separate heating units and steam cookers in a side-by-side arrangement which, based upon need, may be operated either singly or concurrently. Each unit includes a lower cooking chamber into the bottom region of which there is introduced a suitable tray arrangement on which the food product is supported; and wherein a partition wall structure bounding the upper region of the lower cooking chamber forms a component of the unique steam generating device of the present invention. Basically, the partition wall structure separating the upper and lower chambers within each unit in the enclosure, may be constituted of a metal or metal alloy casting of high thermal conductivity within which there is integrally cast or embedded a suitable, preferably insulated electrical heating coil for raising the partition wall structure to a predetermined elevated temperature. A perforated water tube which is connected to an external water supply source, such as potable tap water, is adapted to inject sprays of water into contact with the heated upper surface of the partition wall structure in the upper chamber, volatilizing the water so as immediately convert the water into heated or supercharged steam, preferably within a temperature range of about 212° to 375° F., or even higher. The partition wall structure is provided with a plurality of spaced vertically extending orifices through which the steam generated within the upper chamber is ejected downwardly into the lower cooking chamber, with the orifices being dimensioned and configured so as to propel the steam downwardly at some degree of velocity while concurrently diffusing the steam within the lower cooking chamber so as to uniformly heat the interior of the lower chamber. This will impart a uniform degree of heating to the surface of the food product positioned on the tray arrangement in the lower region of the lower chamber, causing the food product, and particularly the upper surface regions thereof, to be uniformly heated by the heat of the diffused steam within the lower cooking chamber, such heating being quite rapid inasmuch as steam is one of the fastest methods of imparting BTUs to a food product. A chimney, which communicates with the lower region of the lower cooking chamber within which the food product is contained, will impart a drawing effect, and cause the gaseous fluid medium constituted of the heated steam, to be continually circulated throughout the lower chamber prior to being drawn out therefrom.

Pursuant to a specific aspect of the invention, the supporting tray arrangement for the food product includes a generally horizontally oriented tray on which the food product, such as pizza, is positioned, to one end of which there is attached an upright plate member constituting a closure for an access door to the lower cooking chamber for insertion therethrough of the tray, and wherein the opening of the closure will concurrently effect the withdrawal of the tray, and the food product positioned thereon, from the lower cooking chamber as an integral unit.

2. Discussion of the Prior Art

Although numerous patents and publications are currently known in the technology pertaining to the heating and/or cooking of various types of food products, including pizzas, and wherein various of the prior art publications are directed to commercial applications adapted to the so-called "fast-food" operations, none of these provide for the extremely rapid and efficient uniform heating and/or cooking of a food product through the utilization of heated steam with minimum expenditures of energy and at a enhanced heating time rates in a manner analogous to that contemplated by the inventive heating apparatus and method.

Burke U.S. Pat. No. Re. 1,027 of Aug. 21, 1860 discloses a cooking stove incorporating an oven having the interior space thereof uniformly heated by a hot gas which is diffused therethrough. The hot gas is received through an apertured plate arranged along the upper end of the oven, and uniformly circulated about any food located in the lower region of the oven. The hot gas is then vented upwardly by being drawn out through a chimney arranged at the side of the oven and communicating with the lower end region of the oven interior. Although Burke describes the heating of the interior of an oven with a hot gas being circulated therethrough so as to uniformly heat or cook a food product contained therein by basically convection heating, there is no disclosure nor suggestion of the inventive steam generator which will cause steam to be injected and diffused throughout a lower cooking chamber containing the food product to thereby implement the rapid and uniform heating of a food product through the utilization of heated steam.

Similarly, Farber, et al. U.S. Pat. No. 3,828,760 discloses a cooking or heating oven consisting of an enclosure in which a food product is positioned within a lower chamber. Heated air is circulated in a cyclonic vortex, with the air being previously heated in an upper space above the food-containing chamber through the intermediary of heating coils and then forced downwardly by the action of an impeller or fan. There is no disclosure of a steam generator being located above the chamber containing the food product in a manner analogous to that of the invention, and in which heated steam is employed to heat the food product in a rapid and uniform manner, with steam being a gaseous fluid medium through which BTUs can be introduced into a product so as to thereby optimize shortening the time frame for heating the product to the desired extent.

Brown, et al. U.S. Pat. No. 4,377,109 discloses an apparatus for baking a food product, such as pizzas and the like, wherein the pizzas are transported through a heating oven on a continually moving conveyor and wherein jets of heated air are circulated so as to impinge at a relatively low velocity against the surfaces, and particularly the top surfaces of the food product as it is conducted through the heating oven. There is no disclosure of a steam generator arranged above a lower chamber in which a food product, such as pizzas, is positioned in a stationary manner, and whereby jets of steam are injected into the lower chamber so as to be diffused therein and to uniformly heat the chamber to thereby heat the pizza and distribute the heat uniformly across the surface of the food, for instance, in order to uniformly melt top layers of cheese and the like on the pizza.

Perry, et al. U.S. Pat. No. 3,384,068 discloses a warming or cooking oven utilizing a gas system for circulating a flow of heated gas which is placed into motion through the use of a blower or impeller to thereby circulate about the food product in the heating chamber of the oven. There is no disclosure nor suggestion of a steam generator which is employed to provide an environment of heated steam for rapidly and uniformly heating a food product, such as pizza, positioned in the lower chamber of the heating apparatus or oven.

The rapid heating or cooking of different types of food products, such as pizza or the like, which is adapted for fast-food operations and enterprises, is also described in various patents issued to Donald P. Smith, of which U.S. Pat. No. 4,409,453 may be considered to be representative of the state of the art, having specific reference to Figures VII and VIII and the description in the specification relative thereto in that patent. In that instance, vertically downwardly directed jets of a heated gaseous fluid, such as air or the like, are directed at high velocity from a plenum through a series of orifices so as to vertically impinge against and circulate about a food product which is conveyed past the heated fluid jets while oriented normally thereof. The apparatus and method described in the various Donald P. Smith patents does not disclose the utilization of heated steam for uniformly heating a chamber containing a food product, nor the provision of a novel steam generator for generating the steam and thereafter diffusing the steam in the chamber in which the food product is contained, rather than directly impinging against the food product, so as to thereby avoid the formation of so-called "burn" spots or inadequately heated zones on the food product being heated or cooked. Consequently, the Smith U.S. Pat. No. 4,409,453, and the other interrelated Smith patents, among which U.S. Pat. Nos. 4,462,383; 4,479,776; and 4,338,901 are of general interest, all fail to describe the particular inventive apparatus incorporating a steam generator and the diffused heat system produced thereby for rapidly and uniformly heating a food product, such as pizzas, in a manner as contemplated by the present invention.

SUMMARY OF THE INVENTION

Accordingly, it is a primary object of the present invention to provide a heating apparatus for the rapid and uniform heating of a food product positioned within a chamber through the utilization of a novel and unique steam generator which will ensure the diffusion of steam so as to rapidly heat the environment of the chamber containing the food product and which will, as a consequence, uniformly heat the food product within an extremely short time interval.

Still another object is the provision of a heating apparatus of the type described, wherein the food product is supported on a novel tray construction which also constitutes a sealing closure for an access door to a lower chamber of an enclosure containing the food product; and wherein steam is generated by a novel heat generator in an upper chamber and thereafter injected into and diffused within the lower chamber so as to uniformly and rapidly heat the food product, and particularly the upper surface of the food product, and in which the steam is then drawn out through a suitable chimney arrangement enhancing the heating effect on the food product.

Yet another object of the present invention is to provide a novel and unique method of rapidly and uniformly heating a food product, and especially surface regions thereof, through the intermediary of a heating apparatus of the type as described hereinabove.

BRIEF DESCRIPTION OF THE DRAWINGS

Further advantageous features and advantages of the invention may now be readily ascertained from the following detailed description of an examplary embodiment of the novel heating apparatus, taken in conjunction with the accompanying drawings; in which.

DETAILED DESCRIPTION

Figure 1:
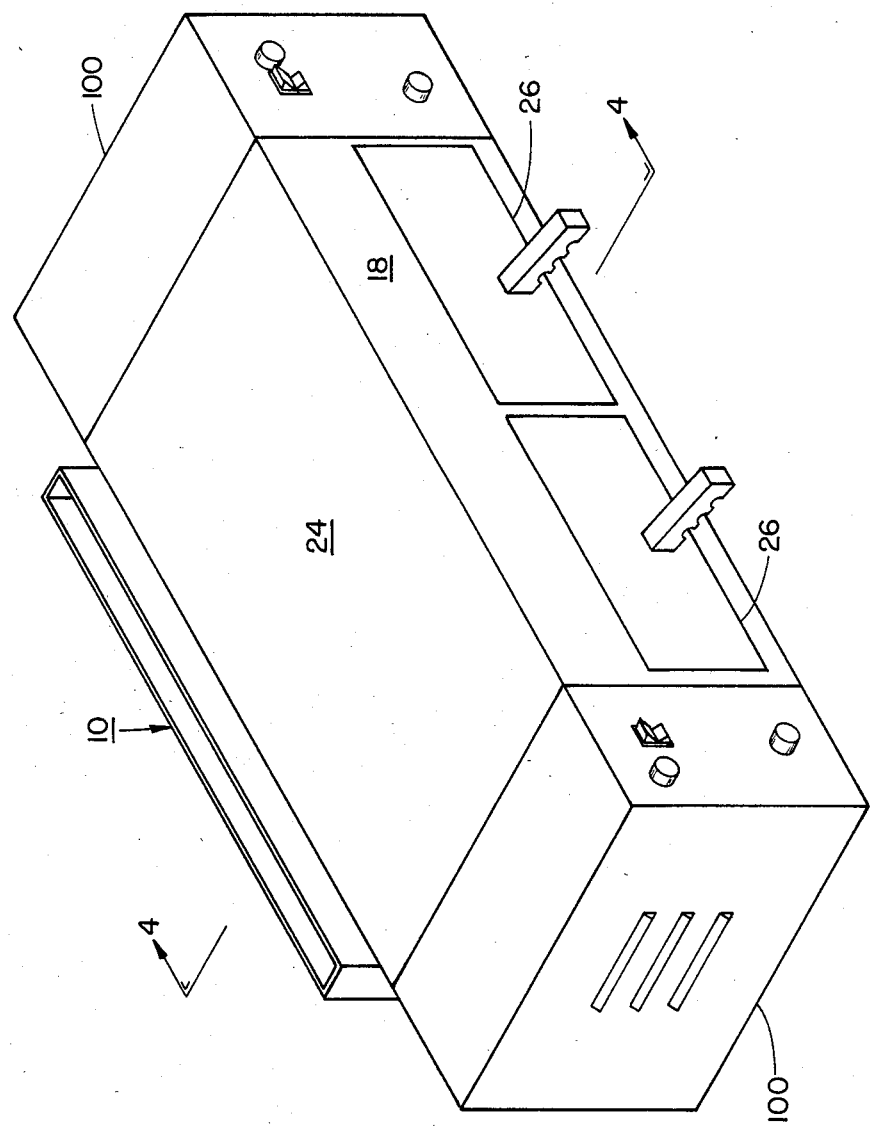
FIG. 1 illustrates a perspective front view of a heating apparatus incorporating the novel steam generator pursuant to the invention, wherein the apparatus essentially comprises two separate food heating units and chambers in a side-by-side arrangement.
Figure 2:
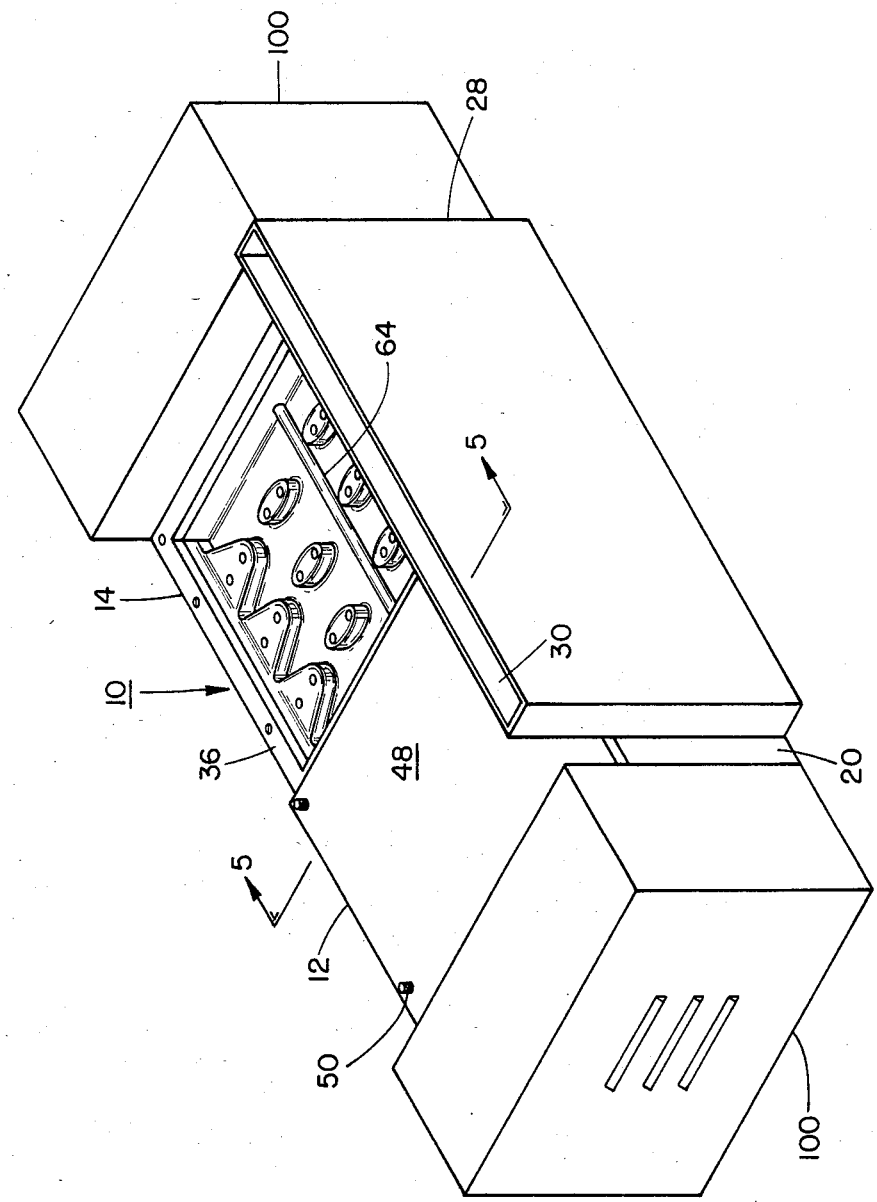
FIG. 2 illustrates a perspective rear view of the apparatus of FIG. 1, with the top lid and one portion of the cover section having been removed to show the interior of the inventive steam generator.

Referring to the following detailed description of the invention, and specifically to FIGS. 1 and 2 of the drawings illustrating an assembly of the inventive heating apparatus 10; the illustrated embodiment provides for two separate heating units 12 and 14 or steam cookers in side-by-side arrangement, which may be operated either independently or concurrently with each other, depending upon customer demand for the heated food product, such as pizzas, at any specific time.

Preferably, the structural components of the entire heating apparatus, with the exception of the steam generator, are primarily constituted of stainless steel in order to render them easier to wash and/or sterilize in compliance with local sanitary regulations and statutes pertaining to restaurants and the food industry in general.

Figure 9:
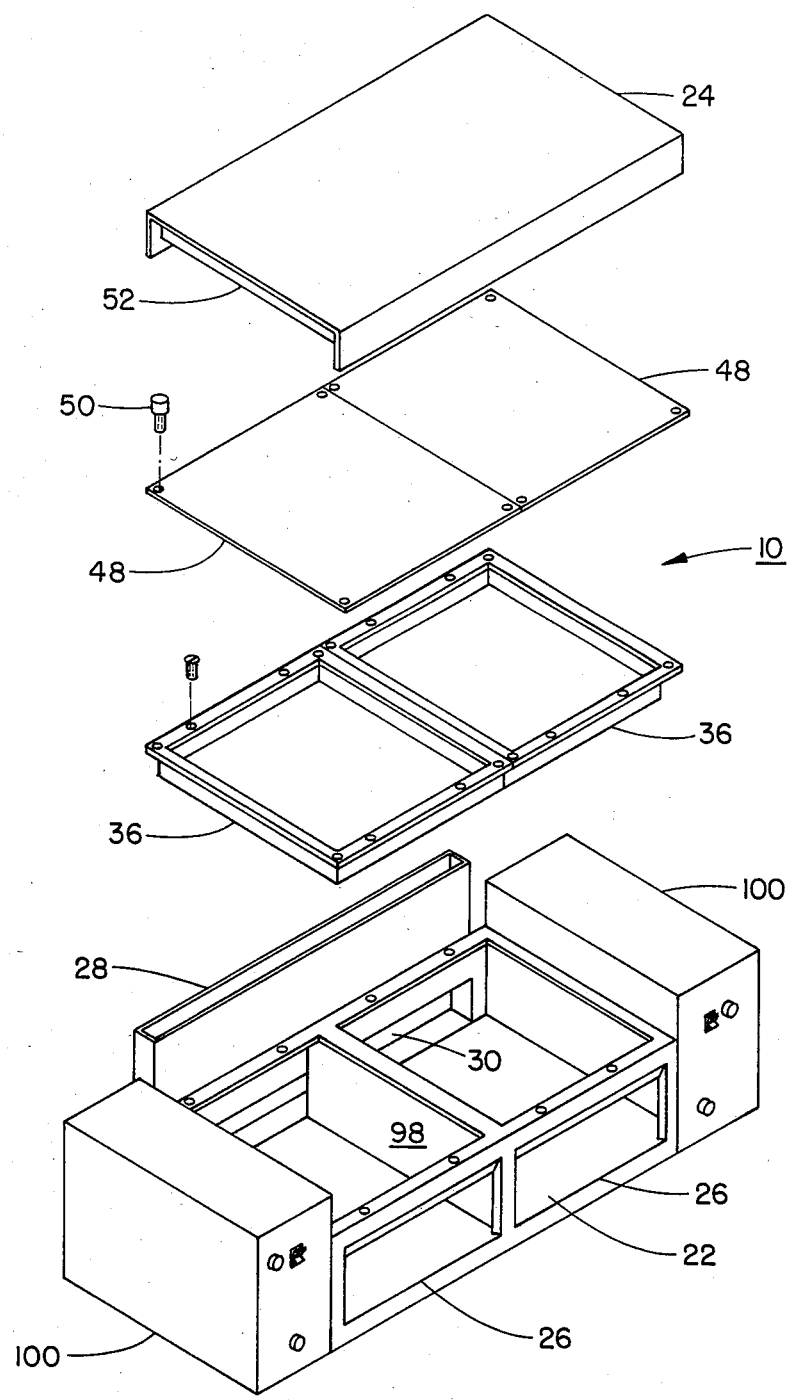
FIG. 9 illustrates an exploded perspective view of the inventive heating apparatus showing it in a disassembled condition.

The heating apparatus 10 includes a cabinet like, rectangular enclosure 16, with side walls, front and rear walls 18 and 20, a bottom wall 22 which may have legs depending therefrom for positioning the apparatus on a countertop or the like, and a detachable top cover or lid wall structure 24 which, in the present instance, covers two separate steam generating sections or units, as is clearly shown in FIG. 2. In the case of the heating apparatus 10 incorporating two or more units 12, 14, each unit is separated from the other by an upright partition wall 98, as shown in FIG. 9, which if desired may be heat insulated. The front wall 18, as illustrated in FIG. 1, is provided with an access or door opening 26 for each unit to allow for the insertion of a food product, such as pizzas, which is to be heated and/or cooked pursuant to the inventive apparatus and method.

A chimney 28, which may also be constituted of stainless steel sheet metal, extends upwardly along the exterior of the rear wall 20, possesses a generally vertical passageway 30 having an upper discharge opening at a height above the top cover wall 24 of the heating apparatus, and a lower inlet opening communicating with the lower region of the cooking or lower chamber of the apparatus 10, as described in further detail hereinbelow.

L-shaped support brackets 32 are fastened within the enclosure of the apparatus so as to form supports for heat or steam generator units 34, in this embodiment two units in side-by-side relationship, as is shown in FIGS. 2 through 5 and 9 of the drawings.

Figure 5:
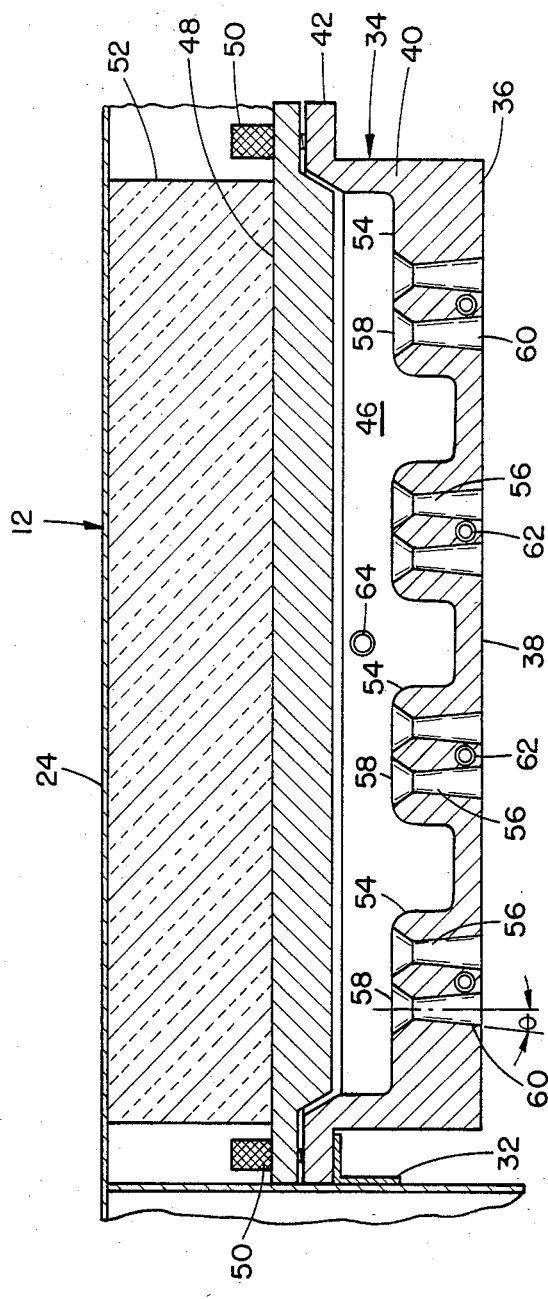
FIG. 5 illustrates a sectional view through one steam generator unit of the heating apparatus, shown on an enlarged scale, taken along line 5—5 in FIG. 2.
Figure 7:
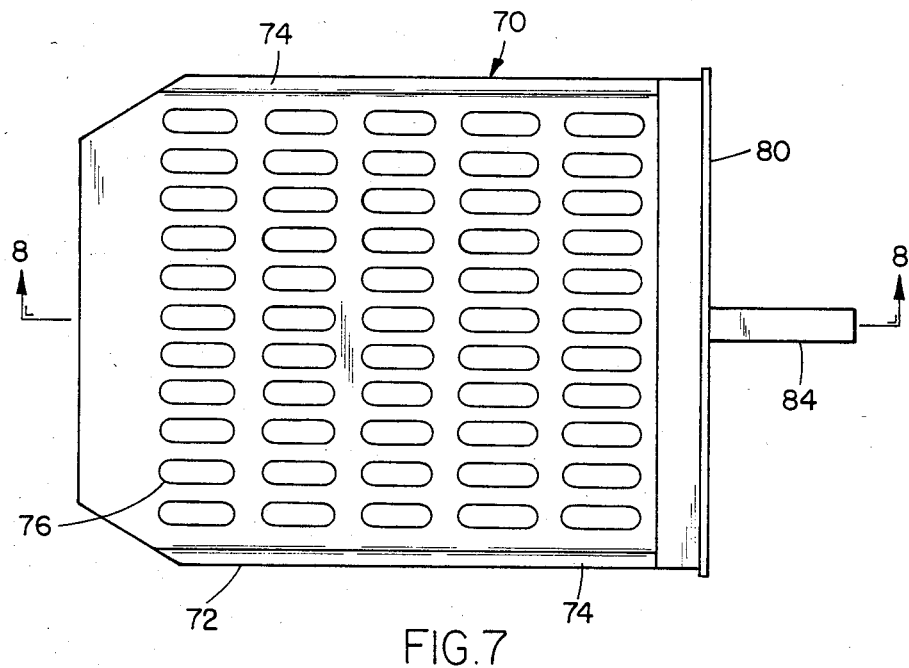
FIG. 7 illustrates a top plan view of a tray arrangement for supporting of the food product within the heating apparatus, which incorporates a closure for an access door to the lower chamber of the apparatus.
Figure 8:
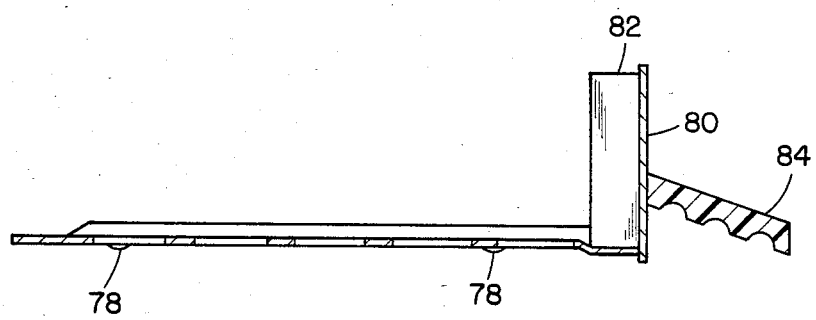
FIG. 8 illustrates a sectional view of the tray arrangement taken along line 8—8 in FIG. 7.

Each heat or steam generator unit 34 pursuant to the invention includes a generally dished or trough-shaped rectangular metal or alloy casting 36 of ferrous or non-ferrous material, preferably such as cast aluminum-magnesium alloy, having a flat bottom wall structure 38 which, along its periphery, extends into upstanding side walls 40, and the latter into radially outwardly projecting flanges 42 which are supported on the L-shaped brackets 32 so as to essentially suspend the steam generator unit 34 therefrom. The wall structure 38 forms a horizontal partition wall which separates the interior of the apparatus enclosure into a lower or cooking chamber 44 and into an upper chamber 46 which is located in the space between the upwardly facing surface of the casting 36 and a cast stainless steel lid member 48 superimposed on the casting 36 and fastened thereto through the intermediary of a plurality of screws 50 screwed into threaded apertures provided in the flanges 42. A gap which is present between the upper surface fo the rest lid 48 and the top wall 24 of the enclosure may be filled with a suitable thermal insulating material 52 in order to reduce any heat losses encountered by the heating apparatus during its operation. Integrally formed in or cast with the upper surface of the plate structure 38 of the heat or steam generator plate unit 36 are a plurality of upstanding spaced bosses 54, as shown in FIG. 5. The raised bosses 54 will prevent any water condensing from the steam as the latter cools between operating cycles from dripping into the lower chamber and onto the food product therein. In each of the bosses 54 there are provided one or more vertically depending cylindrical passageways or orifices 56 which have conically widening upper inlet ends 58 at a conicity of about 20° to 45° with the vertical axis of each of the orifices, and conically widening lower discharge ends 60. The angle of conicity of the lower end 60. The angle of conicity of the lower end 60 of each of the orifices 56 subtends an angle $\theta$ within the range of approximately 15° to 30°, and preferably 20° to 25°, with the vertical longitudinal axis of each of the orifices.

Figure 3:
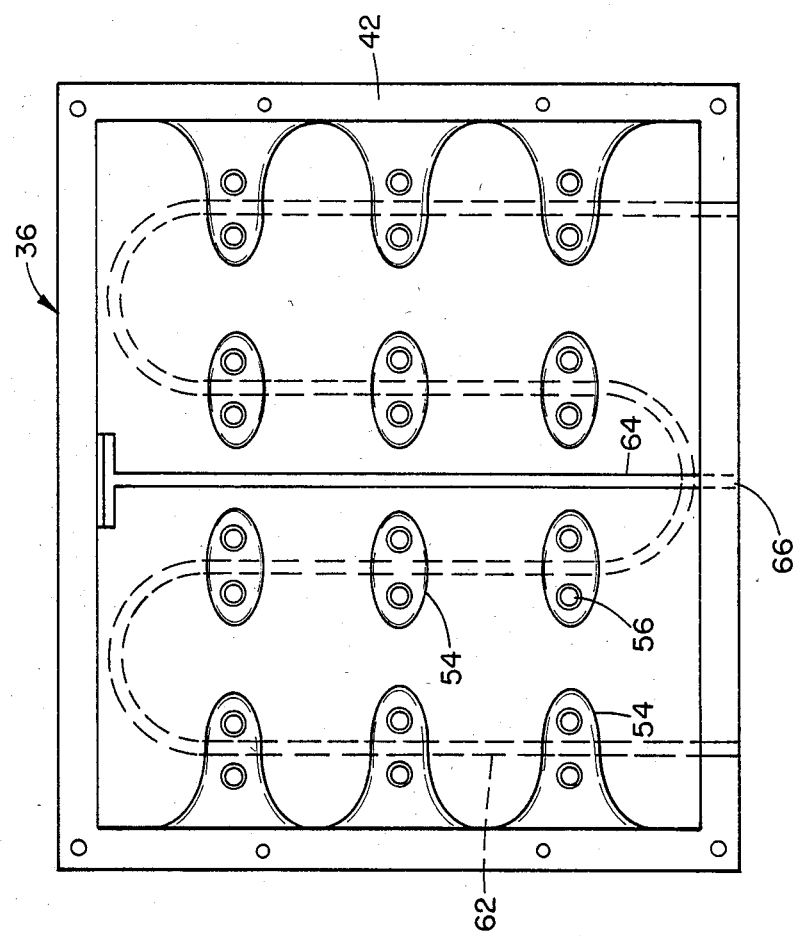
FIG. 3 illustrates a top plan view of the novel steam generator of the inventive heating apparatus.
Figure 4:
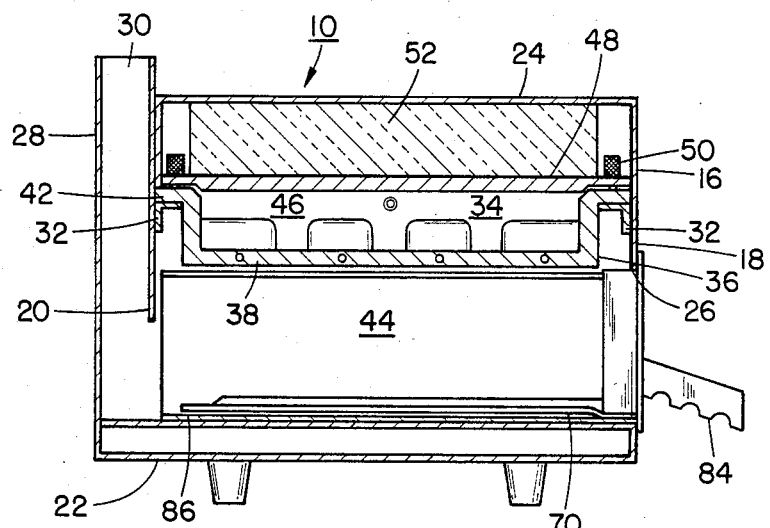
FIG. 4 illustrates a sectional view through the heating apparatus taken along line 4—4 in FIG. 1.

Cast into the wall structure 38 so as to be embedded therein is an insulated electrical heating coil 62, as shown in phantom lines in FIG. 3 of the drawings, which is essentially arranged in an undulating pattern within the wall structure 38 so as to extend between adjoining orifices 56. The electrical heating coil 62 is adapted to be connected to a suitable supply of electrical heating current (not shown).

Extending centrally above the upper surface of the wall structure 38 is at least one water tube 64 having a connection 66 to a suitable water supply source (not shown) for supplying water to the tube at ambient temperature, such a potable tap water, with the tube being provided with a series of perforations (not shown) spaced along its length; and which may be angled towards the upper surface of the wall structure 38.

Insertable through the access opening 26 into the lower cooking chamber space 44 is a tray arrangement 70 supporting a food product, such as pizza or the like, which is to be heated within the heating apparatus 10. The tray arrangement 70 includes a generally horizontal flat tray element 72, having slightly upwardly bent side edges 74 to prevent the inadvertent sliding off of the food product which is supported thereon during handling, and is provided with a plurality of cutouts 76 to reduce the weight of the tray arrangement 70 which is essentially constituted of stainless steel. The tray element 72 may be provided with depending dimples 78 on its bottom surface so as to be somewhat elevated above the surface on which it rests. A rectangularly-shaped vertically oriented plate 80 is fastened to the tray element 72 at the leading edge thereof, with the plate 80 being dimensioned so as to form a closure for the access door or opening 26 upon insertion of the tray arrangement 70 into the lower chamber 44 of the heating apparatus 10. Fastened to the interior surface of the upright plate member 80 proximate its rim is a peripherally extending sheet metal plate 82 which has its free ends joined to the upper surface of the tray element 72, and which is sized to conform to the peripheral dimensions of the access door or opening 26 such that it forms a spatula-like seal or plug within the opening preventing an outflow of the gaseous fluid medium or heated steam from the interior of the lower chamber through the access opening during operation of the heating apparatus. Fastened to the exterior surface of the upright plate 80 is a suitable gripping handle 84, which may be constituted of a heat insulating material, such as a molded thermoplastic, and which will facilitate the ready manipulation of the entire tray arrangement 70 by a user of the apparatus.

Figure 6:
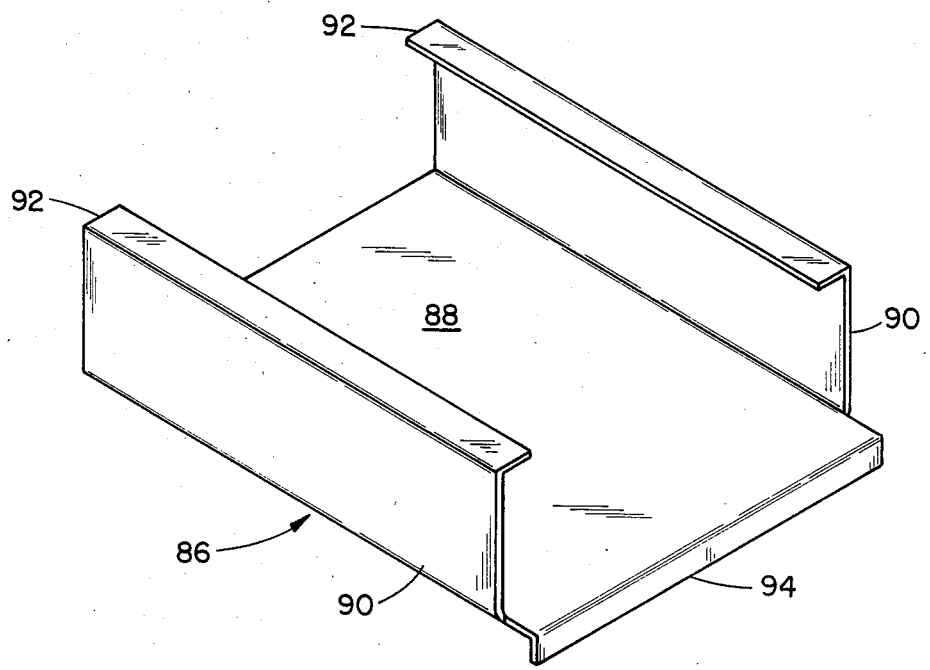
FIG. 6 illustrates a perspective view of a removable shield adapted to be positioned in the lower region of the apparatus for receiving discarded food particles.

Adapted to be inserted beneath the tray 72 of the tray arrangement 70 is a shield 86, as illustrated in the perspective drawing in FIG. 6, which consists of a bottom plate member 88 having upstanding side plates 90 extending into inwardly turned flanges 92 at their upper ends, whereas the bottom plate 88 is provided with a downwardly projecting flange 92 along one edge thereof which rests on the bottom wall of the heating apparatus 10. This shield 86 forms a catcher which will prevent any particles from the food product which is being heated in the apparatus 10 from dropping to the bottom of the apparatus by being arrested on the upper surface of the removable shield 86, so as to facilitate the cleaning of the heating apparatus 10.

The operation of the inventive heating apparatus 10 is essentially as follows:

In order to place the heating apparatus 10 into a state of preparedness, or at least one of the units 12, 14 thereof, depending upon the requirements of the user or establishment at any particular time, the apparatus is preheated by actuating suitable switches in the control unit or units 100, the functions of which are well known in the control art, to preheat the heat generator plate structure 36 by imparting an electrical heating current to the heating coil 62 which is embedded in the wall structure 38. Preferably, the plate 38 is preheated temperature of up to about 375° to 400° F. or as needed, and maintained at that temperature over the entire period of operation or use of the heating apparatus 10. This will also to some extent, preheat the interior of the cooking chamber 44. When it is desired to heat a food product such as melting a layer of cheese on a pizza which is supported on the tray 72 the lower cooking chamber 44, a flow of water, through operation of control 100, is introduced into the water tube 64 through its inlet connection 66 from a water supply source, such as potable tap water, and the water is sprayed through the perforations in the tube 64 to contact the hot upper surface the plate structure 38, causing the water to be immediately volatilized and converted into hot or preferably supercharged steam within a few seconds, for example, about 7 seconds, at a temperature of preferably between 212° to 375° F., or even higher. The build-up of steam in the upper chamber 46 will generate a pressure therein above atmospheric and cause the steam to be expelled downwardly through the orifices 56, and because of the taper of the angle $\theta$, although the steam will maintain some velocity as it is injected into the upper region of the cooking chamber 44, it will diffuse throughout the lower cooking chamber 44 so as to uniformly heat the interior of the latter and almost instantaneously heat the surface of the food product therein impinged upon by the steam to the desired temperature. In order to maintain a precise degree of control over the temperatures of the steam and the chambers 44, 46, suitable thermostats (not shown) may be arranged in either or both the upper and lower chambers of the heating apparatus.

At this time, the support tray 72 with the heated food product may be pulled out from the apparatus by an operator gripping the handle 84 and withdrawing the latter, and the heated food product replaced by another food product which is to be heated, such as pizza having tomato sauce and a cheese topping previously applied thereto, positioned on the tray 72, and thereafter the tray arrangement 70 again inserted into the lower chamber through the access door 26 until the plate member 88 completely seals off the access door 26 in the front surface of the heating apparatus. The steam is then generated and injected downwardly through the orifices by operating a suitable control on the control unit 100, causing the cheese topping to be melted almost instantaneously and uniformly in the lower chamber, upon being contacted by the steam, and thereby also providing an attractive aesthetic appearance to the food product or pizza. Inasmuch as steam is the fastest manner in which to introduce BTUs into a product, the steam impinging against the upper surface of the food product will effect an almost instantaneous absorption of the BTUs by the top layer of the food product, such as cheese, and melting the latter, with only residual steam circulating about the food product. Consequently, the usual heating time for heating pizzas and melting the cheese topping thereon, which can range up to 20 or more seconds, is reduced to a period of approximately 7 seconds by the present steam generating construction, thereby appreciably reducing the turnover time for heating and preparing the food product, such as pizza.

Thereafter, for instance, at the activation of a suitable indicator light and/or audio alarm, the further generation of steam and its introduction into the lower cooking chamber 44 may be terminated by a suitable switching device (not shown) in the control unit 100, and the support tray arrangement 70 the food product thereon withdrawn from the apparatus 10 to prepare it for serving to a customer. During the steam generating period, when the steam is injected into and contacts the food product within the lower chamber, it is drawn into and upwardly through the passageway 30 in the chimney 28, producing a drawing effect which will ensure a constant flow of hot steam through the lower cooking chamber, and thereby aid in the extremely rapid and uniform heating of the food product by the hot steam.

Depending upon the needed volume at any time of food product which has to be heated by means of the heating apparatus 10, one or both of the heating units 12, 14 therein may be operated concurrently or independently.

It is also possible to contemplate the heating apparatus 10 possessing a construction with only a single heating unit 12 or 14, which would be extremely compact and particularly adapted for use as a home appliance, whereas for commercial applications, the presently illustrated embodiment incorporates two heating units 12, 14 in a side-by-side relationship, or may combine even more heating units for large volume operations.

Having reference to FIG. 9 of the drawings, there can be ascertained the ready manner in which the components of the heating apparatus 10 can be assembled and disassembled by merely superimposing and aligning the various structural components above each other, and fastening them together by means of suitable screws or the like. This will permit the entire apparatus to be quickly disassembled subsequent to use, and cleaned and/or sterilized in a manner in compliance with sanitary regulations regulating of the food industry, particularly inasmuch as practically all major components are constituted of easily cleanable stainless steel.

Although the foregoing heating apparatus 10 has been described primarily in connection with the heating of a food product such as pizza and the uniform and rapid melting of a cheese topping thereon, it will be readily apparent to one skilled in the art that the heating apparatus 10 can be utilized for not only heating, but also for steaming, cooking, and baking of numerous types of food products.

While there has been shown and described what is considered to be preferred embodiment of the invention, it will of course be understood that various modifications and changes in form or detail could readily be made without departing from the spirit of the invention. It is therefore intended that the invention be not limited to the exact form and details herein shown and described, nor to anything less than the whole of the invention herein disclosed as hereinafter claimed.

What is claimed is:

1. An apparatus for the rapid and substantially uniform heating of a food product, especially surface regions thereof, comprising an enclosure, generally horizontal partition wall structure in said enclosure separating said enclosure into a lower chamber for receiving said food product and an upper chamber incorporating means for generating temperature-controlled heated steam in said upper chamber; means for stationarily supporting said food product in the lower region of said lower chamber; a plurality of spaced orifices in said partition wall structure communicating said upper chamber with said lower chamber for directing discrete flows of said steam from said upper chamber into said lower chamber so as to diffuse and circulate said steam within said lower chamber and to impinge against the upper surface of the food product contained therein for rapidly heating the latter; said steam generating means including means for heating said partition wall structure to a predetermined temperature; means for injecting a liquid at generally ambient temperature into said upper chamber so as to contact the heated partition wall structure to volatilize said liquid and form said heated steam, said liquid injecting means including at least one perforated water tube extending into said upper chamber, said tube being connected a source for supplying water thereto, said water being volatilized into said steam upon contacting the heated partition wall structure, said means for heating said partition wall structure including heating coil means extending within the surface regions of said partition wall structure intermediate said spaced orifices; and chimney means communicating with the lower region of said lower chamber to assist in circulating said steam through said lower chamber and thereafter drawing said steam from said enclosure.

2. An apparatus as claimed in claim 1, wherein said partition wall structure is constituted of a cast aluminum-magnesium alloy, said heating coil means comprising insulated electrical heating coils embedded within said wall structure.

3. An apparatus as claimed in claim 2, wherein raised bosses are integrally formed with said partition wall structure, said bosses projecting upwardly into said upper chamber, and said orifices being arranged to extend vertically through said bosses to inhibit any liquid within said upper chamber from flowing downwardly into said lower chamber.

4. An apparatus as claimed in claim 1, wherein said means for generating said heated steam in said upper chamber produces supercharged steam at a temperature within the range of about 212° to 375° F.

5. An apparatus as claimed in claim 2, wherein said orifices each comprise a vertically depending cylindrical flow passageway having conically widening inlet and discharge ends, the lower discharge end of each said passageway subtending an angle of conicity of about 15° to 30°, and preferably 20° to 25°, with the vertical axis of each said passageway.

6. An apparatus as claimed in claim 1, wherein said enclosure comprises a generally rectangular cabinet having front, rear, side, bottom and top walls; a rectangular opening in the front wall forming an access door to the lower chamber, said support means for said food product including a horizontal tray member insertable into the lower region of said lower chamber through said access door, a rectangular plate member being fastened to and extending perpendicular to said tray member, said plate member being dimensioned to form a closure for said rectangular access door opening upon insertion of said tray member into said lower chamber.

7. An apparatus as claimed in claim 6, wherein plate means extend proximate the edges of said plate member and project along the direction of said tray member, said plate means and the surface of said tray member having peripheral dimensions corresponding to the dimensions of said access door opening so as to form a spatula-like plug structure preventing outflow of said heated steam from said apparatus during the fully inserted position of said tray member.

8. An apparatus as claimed in claim 7, wherein a gripping handle is fastened to said plate member facing outwardly of said apparatus opposite the tray member.

9. An apparatus as claimed in claim 8, wherein said tray member, plate member and plate means of said support tray means are constituted of stainless steel, and said gripping handle is formed of a heat-insulating material.

10. An apparatus as claimed in claim 6, wherein the walls portions of said apparatus are constituted of stainless steel.

11. An apparatus as claimed in claim 6, wherein said chimney means comprises an upwardly projecting passageway extending outwardly along the rear wall of said enclosure, said passageway having an upper discharge end, and said rear wall having a lower opening extending substantially thereacross providing communication between the lower end of said passageway and the lower region of said lower chamber to produce an upward drawing effect on the steam being circulated about the food product in the lower chamber outwardly through said chimney means.

12. An apparatus as claimed in claim 6, wherein said tray member is an apertured plate.

13. An apparatus as claimed in claim 6, wherein a removable shield member is arranged to extend below said tray member in said lower chamber to inhibit accumulation of food particles from said food product at the bottom of said apparatus.

14. An apparatus as claimed in claim 6, including cover plate means being superimposed on said partition wall structure to define said upper chamber therebetween; and insulating means being arranged between said cover plate means and the top wall of said cabinet to reduce heat losses from said apparatus during operation thereof.

15. An apparatus as claimed in claim 6, comprising control means for actuating said apparatus fastened to the outside of one at least one side wall of said enclosure.

16. An apparatus as claimed in claim 1, comprising a plurality of said heating apparatuses being connected in a side-by-side arrangement for either individual and concurrent operations.

17. A method for the rapid and substantially uniform heating of a food product within an enclosure having a lower chamber for receiving said food product and an upper chamber; comprising generating heated temperature-controlled steam in said upper chamber; positioning said food product in the lower region of said lower chamber; conveying said steam through plurality of spaced orifices communicating said upper chamber with said lower chamber so as to direct discrete flows of said steam from said upper chamber into said lower chamber, said generating of said steam comprising heating a partition wall structure intermediate said upper and lower chambers to a predetermined temperature, and injecting a liquid at generally ambient temperature into said upper chamber to contact the heated partition wall structure and volatilize said liquid to form said steam, injecting said liquid comprising discharging said liquid from at least one perforated water tube extending into said upper chamber, said liquid being water volatilized into said steam upon contacting the heated partition wall structure; heating said partition wall structure through heating coils arranged within said partition wall structure intermediate said spaced orifices; and diffusing and circulating said steam within said lower chamber to impinge against and rapidly heat the upper surface of the food product contained therein; and discharging the steam from said enclosure through an outlet communicating with the lower region of said lower chamber.

18. A method as claimed in claim 17, wherein said steam generated in said upper chamber comprises supercharged steam at a temperature within the range of about 212° to 375° F.

* * * * *